M. ROELLIG.
SUBSIDIARY PLANT FOR DRIVING PROPELLER SHAFTS WHEN NOT UNDER LOAD.
APPLICATION FILED AUG. 23, 1912.
1,206,254.
Patented Nov. 28, 1916.
3 SHEETS—SHEET 1.
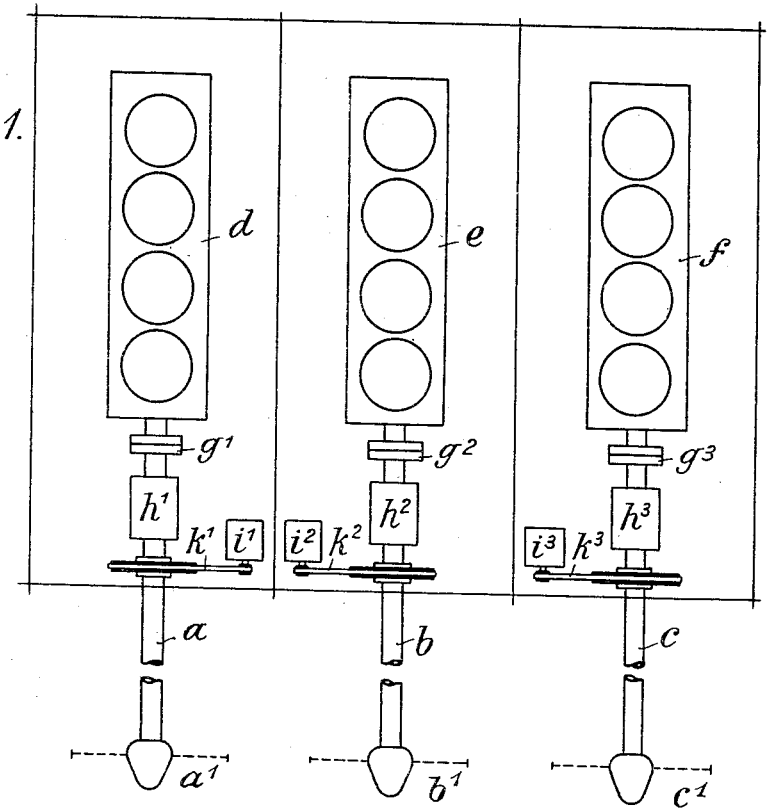
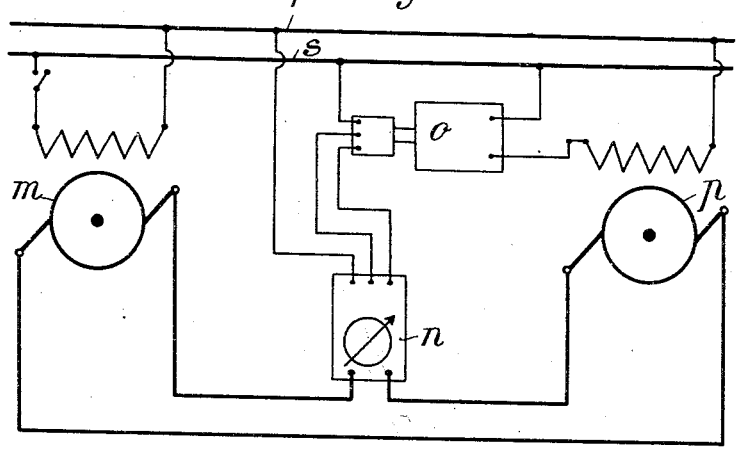
Witnesses:
Carl L. Choate.
Adolph C. Kaiser.
Inventor:
Martin Roellig,
by Emery, Booth, Janney Varney
Attys.

M. ROELLIG.
SUBSIDIARY PLANT FOR DRIVING PROPELLER SHAFTS WHEN NOT UNDER LOAD.
APPLICATION FILED AUG. 23, 1912.
1,206,254.
Patented Nov. 28, 1916.
3 SHEETS—SHEET 2.
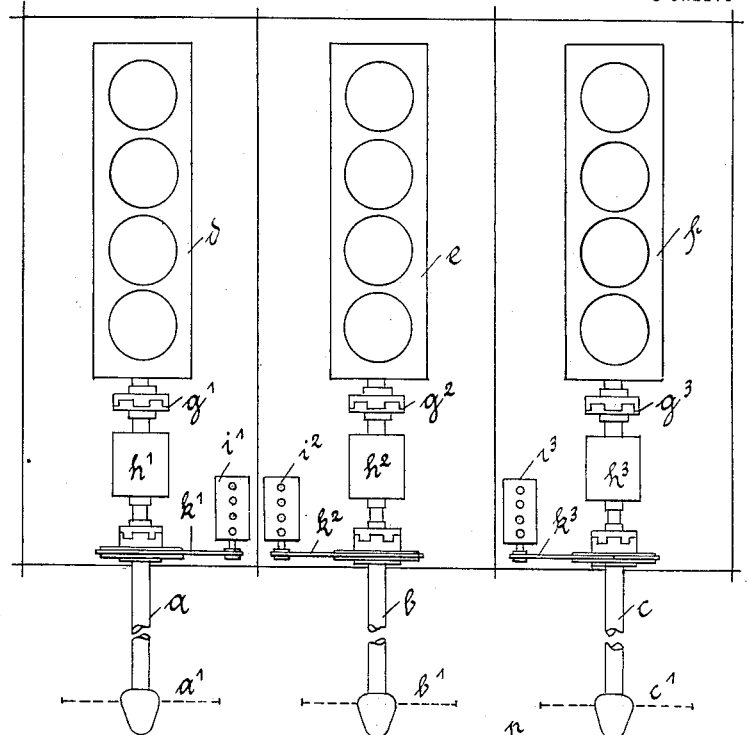
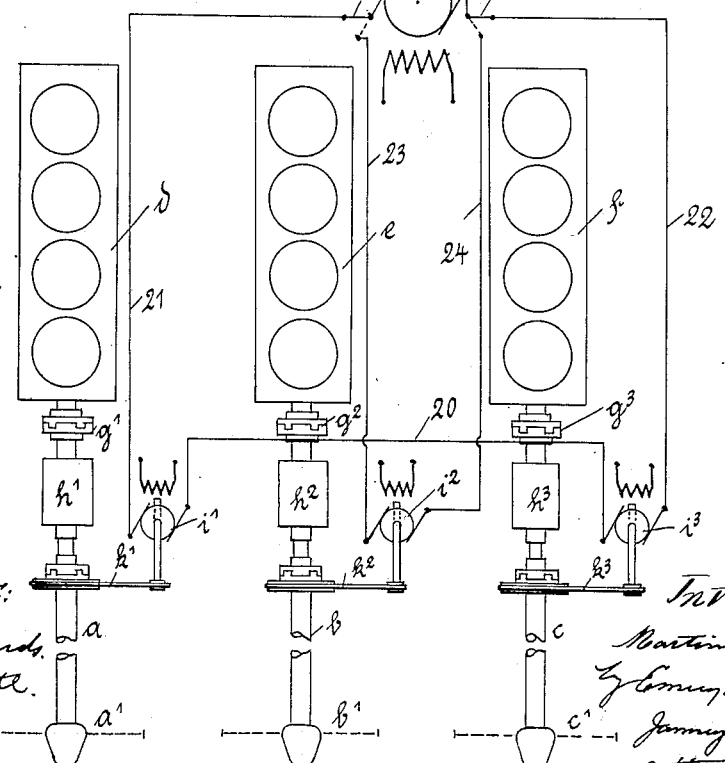

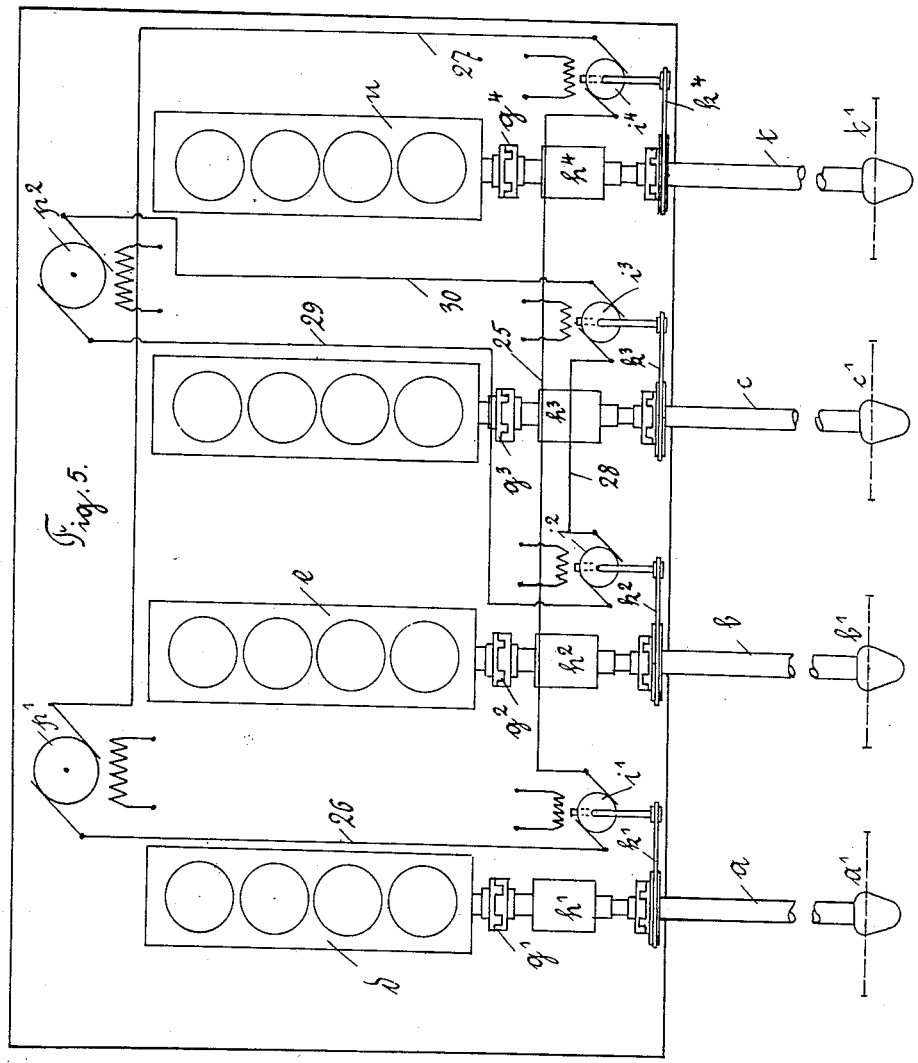

UNITED STATES PATENT OFFICE.

MARTIN ROELLIG, OF BREMEN, GERMANY.

SUBSIDIARY PLANT FOR DRIVING PROPELLER-SHAFTS WHEN NOT UNDER LOAD.

1,206,254.   Specification of Letters Patent.   Patented Nov. 28, 1916.

Application filed August 23, 1912.   Serial No. 716,642.

*To all whom it may concern:*

Be it known that I, MARTIN ROELLIG, a citizen of the Empire of Germany, residing at Bremen, in the Empire of Germany, have invented a new and useful Subsidiary Plant for Driving Propeller-Shafts when not Under Load, of which the following is a specification.

With ships, more particularly warships, propelled by more than one propeller, attempts have been made to economize in the use of power when, for instance, the ship is moving at slow or half speed, by driving only one of the several propellers, the fact being taken into consideration that with most of the engines the consumption of the driving medium (steam, benzin, tar-oil, electricity, etc.) per effective horse power hour is the smaller, the nearer the actual work required of the engine is to its normal work. When assuming a ship provided with three independent engines for separately driving three propeller shafts is moving say, at half speed, it would seem from the above reasons that it ought to be more advantageous to put into use only the middle propeller shaft by means of the middle engine, than to drive all the three propeller shafts at a time, as in the latter case each of the three engines would have to develop only one third of the work, which the middle engine would have to perform, were it alone to propel the ship at the same speed. In practice, however, this is not always so. For even when by propelling the ship in this manner the consumption of driving medium per horse power is reduced, yet very little or nothing is thereby gained in actual economy, since trials have shown, that on account of the power required for towing the idle propellers the horse power necessary for propelling the ship at the same speed was increased by 30% and more. This increase in horse power is explained by the fact, that the actuation of the idle propellers by merely towing them can be effected only with a very little economy in view of the mechanical conditions. In order to avoid these defects, installations have been devised, in which, for low speeds of the ship, the main engines of the several propeller shafts are set at rest, while in a generator working under full load or nearly so and consequently economically, the power is developed and then distributed to the several propeller shafts, for example by means of an electrical transmission. By this arrangement certainly the economy of running at low speeds is improved upon, however, the weight and the space required for such an installation are so great, that hitherto no such installations on a large scale have been made. The great weight and the excessive space wanted are explained by the fact, that the power for moving the ship even at low speeds is so great, that, in proportion to the size of the ship to be propelled, the weight and the space required of such power transmitting plants become uneconomically large. Moreover the whole energy generated for propelling the ship is necessarily transformed, which of course occasions losses.

My invention consists of a subsidiary plant, which avoids the great weight and the excessive space required for installations above referred to. According to my invention either all or a part of the propeller shafts not required for propelling the ship at low speeds are provided with devices, by means of which they are driven at such a speed, that they neither contribute in any considerable way to the driving power of the ship nor produce any resistance, so that the respective propellers practically do not give off or receive any power. In order to render the plant economical, the said devices are to be so proportioned as to work under full load or at any rate nearly so for the said low speeds of the ship. This arrangement presents the advantage, that in as compared with the above mentioned heavy and excessively large installations the subsidiary plant need only be sufficient to develop quite a small amount of power, as it does not serve for propelling the ship but merely to overcome the resistance of friction of propellers and shafts. In consequence of this the subsidiary plant is of small weight and requires but a small space, so that in most cases it can be disposed in the body of the ship without increasing in any way the displacement, and consequently it can be, for example, built in subsequently.

A further advantage of the plant consists in the fact that the whole power for propelling the ship is directly transmitted from the engine to the propeller without undergoing any transformation, so that losses of energy are avoided. The subsidiary plant can be applied most advantageously to ships propelled by means of explosion or combustion motors.

I will now proceed to describe my invention with reference to the accompanying drawing, in which—

Figure 1 diagrammatically shows three combustion motors and three propeller shafts thereby driven for propelling a ship (not shown), also the subsidiary plants for separately driving the propeller shafts when under no load, and Fig. 2 is a diagrammatical representation of a conventional form of connecting a dynamo, motors and a resistance for the purpose of substantially equalizing the current distributed to the several motors, one motor only being shown connected in this instance, for convenience. Fig. 3 is an illustration of an embodiment of my invention wherein subsidiary plants are represented as combustion engines each connected to a separate propeller shaft. Fig. 4 illustrates one form of connecting the port and starboard motors in series so that the strength of the current supplied them may be automatically distributed between the two motors in such manner as to prevent over-loading either one of the motors. Fig. 5 illustrates one mode of connecting motors on both sides of the ship in pairs.

A ship to be propelled may be assumed to be provided with three parallel propeller shafts $a$, $b$, $c$, as is shown in Fig. 1, which are respectively driven independently of one another by means of combustion motors $d$, $e$, $f$. Clutches $g^1$, $g^2$, $g^3$ are disposed, preferably between the motors and the thrust-bearings $h^1$, $h^2$, $h^3$, and should be so constructed in any known manner, that each motor can be easily connected with and disconnected from the corresponding propeller shaft. Three electromotors $i^1$, $i^2$, $i^3$ are disposed for driving the three propeller shafts $a$, $b$, $c$ together with the propellers $a^1$, $b^1$, $c^1$ by means of suitable transmissions $k^1$, $k^2$, $k^3$ of any known and approved kind, which transmissions should be so arranged, that they can be thrown into and out of gear.

When it is desired to propel the ship say at half speed as economically as possible, the two outer combustion motors $d$ and $f$ may be disconnected from their propeller shafts $a$ and $c$ by means of the clutches $g^1$ and $g^3$, so that the middle combustion motor $e$ alone is left to move the ship by means of the middle shaft $b$ and propeller $b^1$. Then the middle motor $e$ will work under a load thrice that under which it would work, if all the three motors were to drive the ship at the same speed. In order to avoid the necessity of towing the outer propeller shafts $a$ and $c$, the two outer electromotors $i^1$ and $i^3$ are started for driving their propeller shafts $a$ and $c$ and their power is increased, until the speed of the shafts is such, that the two propellers $a^1$ and $c^1$ are not towed and do not perform any work, so that their speed is equal to the speed of the ship minus the speed of the water within reach of the lateral propellers.

In case the speed of the ship is to be so much increased, that the middle motor $e$ will no longer be able to produce the necessary power, then the middle motor will have to be disconnected from the middle shaft $b$ by means of the clutch $g^2$, the two outer electromotors $i^1$ and $i^3$ stopped and their transmissions $k^1$ and $k^3$ thrown out of gear, while the two outer motors $d$ and $f$ are connected with their shafts $a$ and $c$ and the middle electromotor $i^2$, after throwing its transmission $k^2$ into gear, is started for so driving the middle propeller $b^1$, that the latter practically neither produces nor consumes any power. This manner of propelling the ship is particularly advantageous for explosion motors and still more so for combustion motors for the reason, that when these motors work under considerably less than 50% of the full load, their specific consumption of liquid combustible increases at a much greater rate in proportion to the decrease of their load than is the case with other engines, and further the safety in working is reduced for very small loads owing to the soiling of the cylinders.

When electromotors as in Fig. 1 are employed for turning the propeller shafts in the manner described, it is advisable to provide the following devices: As the number of revolutions of the propeller shafts which do not impel the ship but are driven by the subsidiary engines essentially depends upon the speed of the water passing along their propellers and only to a very slight degree upon the comparatively small power of the electromotors, care must be taken, that for varying speeds of the ship, the strength of the current passing through the electromotors be maintained at a suitable or permissible height during the variation of the number of revolutions of the respective propeller shafts. There are most diversified means for attaining this object. For example this may be effected in a simple manner in a system with distributing conductors $r$ and $s$ under constant pressure as in Fig. 2 by inserting a contact current meter $n$ in the circuit of the armature $m$ of the electromotor, which contact current meter with the aid of an automatically regulating resistance $o$ so adjusts the exciting current of a dynamo $p$, that the electromotor $i$ connected with the dynamo $p$ in the way of Leonard is driven with a current of constant strength suitably adjusted for the circumstances.

Further precautions may be taken in the following case: When for example a ship provided with three engines and three propeller shafts, as illustrated in Fig. 1, by porting the helm turns to the left, during this turn of the ship the port shaft $a$ will run at a slower speed, but the starboard shaft $c$ at a quicker speed, and at the same time the electromotive counter force of or friction drag on the port electromotor $i^1$ will sink, while that of the starboard electromotor $i^3$ will rise. This variation of the current strength will result in an overloading of the port electromotor and an underloading of the starboard electromotor, which must be absolutely avoided. This is best effected by connecting the port electromotor or electromotors in series with the starboard electromotor or electromotors. Then the sum of the electromotive counter forces of both motors will remain nearly constant also during the turn of the ship and consequently the strength of current will vary within permissible limits. In case several shafts are disposed on each side of the ship, the electromotors may be connected in pairs or all in series.

Thus the embodiment according to Fig. 5 shows a marine engine plant, in which four propeller shafts $a$, $b$, $c$ and $t$ can be rotated by the main engines $d$, $e$, $f$ and $u$, and are provided with auxiliary motors $i^1$, $i^2$, $i^3$, $i^4$, respectively. The outside motors $i^1$ and $i^4$ for the port and starboard sides are connected with each other through a transmission 25, and with a generator $p^1$, through transmissions 26 and 27, while the inner motors $i^2$ and $i^3$ of the starboard and port side are connected with each other through a transmission 28 and with a generator $p^2$ through transmissions 29 and 30. If in this embodiment all of the shafts $a$, $b$, $c$ and $t$ are rotated by means of their main engines $d$, $e$, $f$ and $u$, the generators $p^1$ and $p^2$ are cut out. If, however, only the two outer shafts $a$ and $t$ are driven by their main engines $d$ and $u$, then the generator $p^2$ is connected in the circuit whereby the propellers on the shafts $b$ and $c$, through the auxiliary motors $i^2$ and $i^3$ connected in series by means of the transmissions 28, 29 and 30, are rotated in such a manner that they neither perform nor receive work. If finally the two inner shafts $b$ and $c$ are rotated by their main engines $e$ and $f$, then the generator $p^1$ is put in the circuit, so that the propellers on the shafts $a$ and $t$ are rotated, for the purpose and in the manner indicated, by their auxiliary motors $i^1$ and $i^4$ connected in series by means of the transmissions 25, 26 and 27.

Fig. 6 shows an embodiment of the invention having five propeller shafts $a$, $b$, $c$, $t$ and $r$, which can be driven by the main engines $d$, $e$, $f$, $u$ and $w$, respectively. In the arrangement shown in Fig. 6 the auxiliary motor $i^3$ for the medial propeller shaft $c$ can be connected with the generator $p$ through the transmissions 31 and 32, while all the other auxiliary motors $i^1$, $i^2$, $i^4$, $i^5$ of the two sides of the ship are connected with each other through the transmissions $33^a$, $33^b$ and $33^c$, and can be connected in the generator $p$ through the transmissions 34 and 35. The various connections are effected through switches $s^1$ and $s^2$. In the connection shown in Fig. 6, only the medial propeller shaft $c$ is rotated by its main engine $f$, while the auxiliary motors $i^1$, $i^2$, $i^4$ and $i^5$ of the two sides of the ship are all connected in series through the transmissions $33^a$, $33^b$, $33^c$, and connected to the generator through the transmissions 34 and 35.

On all ships, for which the present invention may be taken into consideration, the electric plant required for the usual machines and devices will simply have to be so increased as to be capable of also driving the electromotors of the present subsidiary plant, and consequently in general no special dynamo will be required for the said plant.

The subsidiary plant described can be varied in many respects without departing from the spirit of my invention.

I claim:

1. In a ship, the combination with several power producing units, of propeller shafts, clutches for severally connecting said engines with said propeller shafts and disconnecting them from the latter, subsidiary power producing units, and transmissions from said subsidiary power producing units to said propeller shafts, said subsidiary power producing units being adapted to so drive said propeller shafts that the propeller practically neither gives off nor receives any power.

2. In a ship, the combination with several power producing units, of propeller shafts, clutches for severally connecting said power producing units with said propeller shafts and disconnecting them from the latter, power producing units, means for automatically maintaining nearly constant a suitable strength of the current passing through said power producing units, and transmissions from said power producing units to said propeller shafts, said power producing units being adapted to so drive said propeller shafts that the propeller practically neither gives off nor receives any power.

3. In a ship, the combination with several engines, of propeller shafts, clutches for severally connecting said engines with said propeller shafts and disconnecting them from the latter, electromotors, transmissions from said electromotors to said propeller shafts, a dynamo, conductors connecting said dynamo with said electromotors, an automatically regulating resistance connected with said conductors, and a contact current meter connected with said conductors and adapted to control said automatically regulating resistance for maintaining nearly constant a suitable strength of the current passing through said electromotors, said electromotors being adapted to so drive said propeller shafts that the propeller practically neither gives off nor receives any power.

4. In a ship, the combination with several engines, one of them in the vertical longitudinal central plane of the ship, of propeller shafts, clutches for severally connecting said engines with said propeller shafts and disconnecting them from the latter, electromotors, means for automatically maintaining nearly constant a suitable strength of the current passing through said electromotors, and transmissions from said electromotors to said propeller shafts, said electromotors being adapted to so drive said propeller shafts that the propeller practically neither gives off nor receives any power and electromotors on both sides of the ship being connected in pairs.

5. In a ship, the combination with several engines, one of them in the vertical longitudinal central plane of the ship, of propeller shafts, clutches for severally connecting said engines with said propeller shafts and disconecting them from the latter, electromotors, means for automatically maintaining nearly constant a suitable strength of the current passing through said electromotors, and transmissions from said electromotors to said propeller shafts, said electromotors being adapted to so drive said propeller shafts that the propeller practically neither gives off nor receives any power, and electromotors on both sides of the ship being connected in series.

6. Propelling means for ships comprising, in combination, a plurality of power generating mediums, one of said mediums located substantially in a vertical longitudinal plane of the ship, a plurality of propeller shafts, clutches for severally connecting said power generating mediums with said propeller shafts and disconnecting them therefrom, a plurality of electro-motors, means for automatically maintaining a substantially constant current to said electromotors, motors on each side of the ship being connected in pairs and the pairs on both sides of the ship connected in series.

MARTIN ROELLIG.

Witnesess:
    FREDERICK HOYERMANN,
    MARGARETE ROELLIG.